United States Patent [19]

Knabe et al.

[11] Patent Number: 4,989,725

[45] Date of Patent: Feb. 5, 1991

[54] GRATE BAR SURFACE IN PASTEURIZERS

[75] Inventors: Uwe Knabe, Holzwickede; Alois Klinge, Lünen; Hans-Joachim Fründt; Ulrich Geltenpoth, both of Dortmund, all of Fed. Rep. of Germany

[73] Assignee: Holstein und Kappert Aktiengesellschaft, Dortmund, Fed. Rep. of Germany

[21] Appl. No.: 403,652

[22] Filed: Sep. 6, 1989

[30] Foreign Application Priority Data

Sep. 12, 1988 [DE] Fed. Rep. of Germany ....... 3830960

[51] Int. Cl.$^5$ .............................................. B65G 25/00
[52] U.S. Cl. .................................. 198/774.1; 432/121; 432/239
[58] Field of Search .......................... 198/774.1–774.4, 198/775, 776; 414/750; 432/121, 239

[56] References Cited

U.S. PATENT DOCUMENTS

| 4,582,483 | 4/1986 | Braud | 198/774.1 |
| 4,690,270 | 9/1987 | Braymand | 198/774.1 |
| 4,820,150 | 4/1989 | Ushijima | 198/774.1 |

Primary Examiner—Joseph E. Valenza
Attorney, Agent, or Firm—Toren, McGeady & Associates

[57] ABSTRACT

A surface formed by grate bars in pasteurizers and the like. The grate bars are movable so as to perform a pilgrim step-like or reciprocating movement. The grate bars are placed on sectional girders. The ends of the grate bars placed on the sectional girders are Z-shaped. Each sectional girder has at its upper end face a groove-shaped recess and an elongated slot-like recess vertically spaced from the groove-shaped recess. The end of each grate bar has an opening for inserting the grate bar into the slot-like recess of the sectional girder. By inserting an end of a grate bar into the slot-like recess and raising the end of another opposite grate bar, the two facing grate bar ends are vertically and laterally centered.

3 Claims, 1 Drawing Sheet

GRATE BAR SURFACE IN PASTEURIZERS

BACKGROUND OF THE INVENTION

1. Field of the Invention

The present invention relates to a surface formed by grate bars in pasteurizers and the like. The grate bars are movable so as to perform a pilgrim step-type or reciprocating movement. The grate bars are placed on grate bar supports in the form of sectional girders. The ends of the grate bars placed on the supports are Z-shaped.

2. Description of the Related Art

Pasteurizers with conveying surfaces consisting of individual grate bars are used particularly in the beverage industry in which beverages filled into bottles, cans and the like are pasteurized to improve their durability. The grate bars are moved backwards and forwards in a pilgrim step-type movement and, thus, the grate bars which are alternatingly stationary and moved pick up the individual bottles and the like and convey them through the individual treatment zones. The grate bars are arranged spaced apart from each other and thereby provide a relatively large passage area for the pasteurizing liquid and for any remaining pieces of burst bottles. For this reason, such grate bar surfaces consisting of grate bars which are moved in a pilgrim step-type movement have been found very useful in pasteurizers.

In a known grate bar surface of the above-described type, the grate bars are provided with openings and the grate bars are locked in web-like sectional and comb-like girders by bending the respective webs to each other in the region of the openings. Special tools are required for this purpose. When the bending operation is carried out carefully, the locked connection may last a long time. However, it may happen over time that the webs of the respective sectional and comb girders which face each other are displaced and, thus, a loosening of the individual grate bars cannot be prevented. This means that such pasteurizers become useless relatively quickly. In addition, the relatively large number of individual grate bars and fastening points mean that an extensive assembly is required.

It is, therefore, the primary object of the present invention to provide a self-locking or self-securing grate bar surface which is simple and can be assembled without special tools. The individual grate bars should be self-centering by a simple placement and joining of the grate bars.

SUMMARY OF THE INVENTION

In accordance with the present invention, in a surface formed by a plurality of grate bars, the sectional girder has at its upper end face thereof a groove-shaped and-/or stop-like recess and an elongated slot-like recess vertically spaced from the groove-shaped recess. The end of the grate bar to be placed on the sectional girder also has an opening which make it possible to insert the grate bar into the recess of the sectional girder. As a result, by inserting the opposite second grate bar end and raising the first grate bar end, the two facing grate bar ends are vertically and laterally centered.

In accordance with a further feature of the present invention, a comb-like girder for laterally centering the grate bar ends is arranged parallel to the sectional girder which extends transversely of the grate bars.

In accordance with another advantageous feature of the present invention, the comb-like girder includes at least one web at the side of the opening of the sectional girder for securing the grate bars against lateral displacement.

The grate bar surface proposed in accordance with the present invention eliminates the above-described disadvantages of known grate bar surfaces. In addition, a grate bar surface or plane is provided which is secure and can be assembled practically without tools. Even over long periods of use, the bars according to the present invention are not subjected to the problems of the known grate bars.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
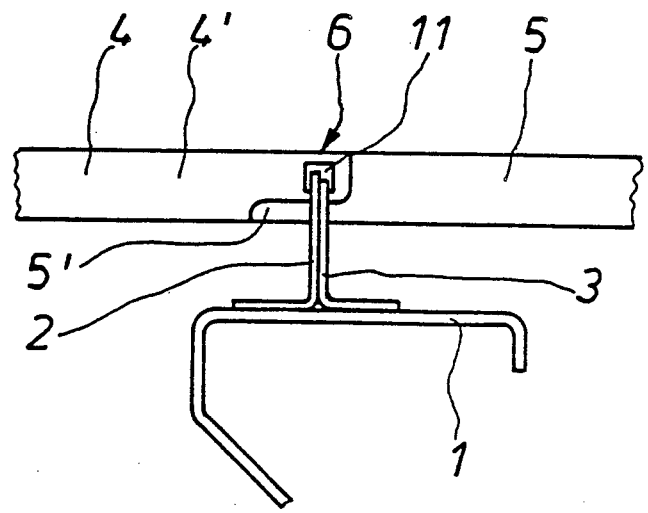
FIG. 1 is a partial side view of the grate bar surface according to the present invention.

As illustrated in FIG. 1 of the drawing, the grate bar surface includes a stationary support 1 arranged underneath the plane of movement. A sectional girder 2 and a comb-like girder 3 extending parallel to the sectional girder 2 are arranged on the support 1. On the ends facing away from the support 1, the ledges receive the individual grate bars 4 and 5 in appropriate recesses. The upper side edges of the grate bars 4 and 5 form the actual grate bar surface 6.

Figure 3:
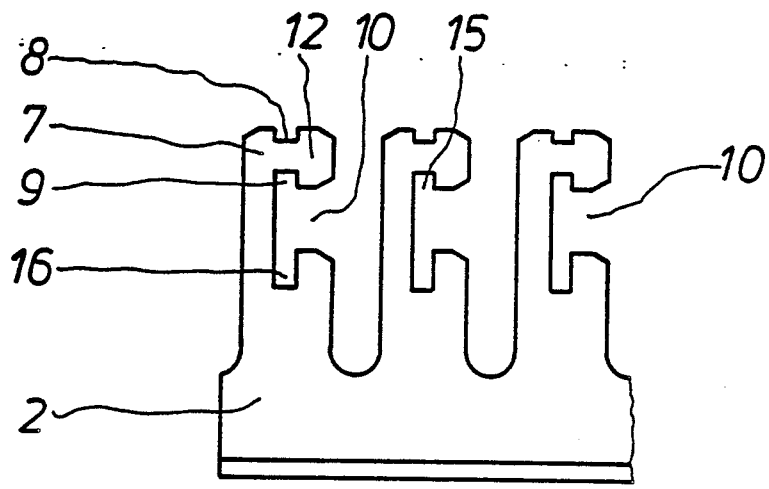
FIG. 3 is a partial side view, on a larger scale, of the sectional girder receiving the bars.

As illustrated in FIG. 3 of the drawing, the sectional girder 2 has at its upper end face 7 a groove-like recess 8. At a distance below the recess 8, another recess 9 is provided. Recess 9 is elongated and slot-like and has a lateral opening 10.

As further illustrated in FIG. 1, the ends of the grate bars 4 and 5 are Z-shaped. The end of grate bar 4 additionally has an opening 11 which is of such a size that the grate bar can be placed over the web 12 of the sectional girder 2 and into the recess 8.

Thus, for assembling the entire grate bar surface, initially the ends of the grate bars 4 equipped with the openings 11 are placed in the recesses 8 and the opposite ends of the grate bars 4 are subsequently mounted and-/or vice-versa. By raising the end of the first grate bar 4 and by inserting the opposite end of grate bar 5, the end of the first grate bar 4 or the opening 11 in this end is raised, so that the grate bar is locked with its end face 14 in the appropriate groove 15 of the recess 9. The portion of the grate bar end 5 located below grate bar end 4, in turn, is centered in the lower part 16 of the recess 9. This results in a problem-free and secure mounting of the entire grate bars 4, 5 to form a grate bar surface 6.

In addition, for finally fixing the individual grate bars 4, 5, a comb-like girder 3 may be arranged parallel to the sectional girder 2. This comb-like girder 3 closes with its webs the recess 9 of the sectional girder. A web 18 of the comb-like girder 3 in the region of the opening 10 of the sectional girder 2 may be sufficient for securing the entire system.

Figure 2:
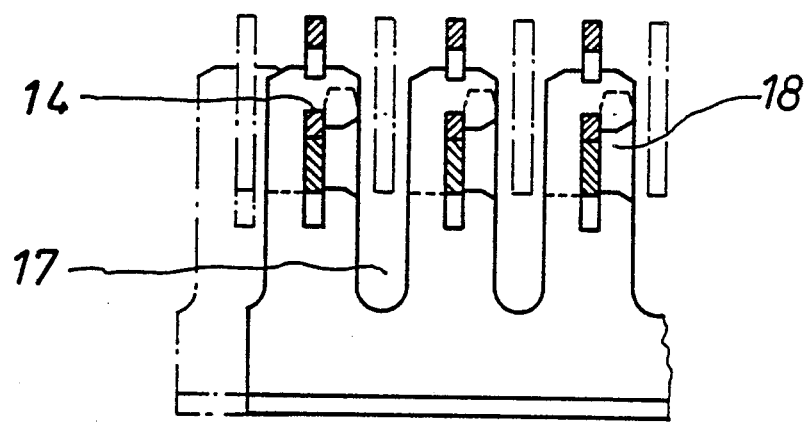
FIG. 2 is a front view, on a larger scale, of the surface shown in FIG. 1.

It is possible to use the above-described system for the stationary grate bars as well as for the grate bars which are moved backwards and forwards vertically and horizontally. As particularly shown in FIG. 2, the movable and the stationary grate bars are arranged spaced apart from each other. The movable grate bars can move vertically and horizontally in recesses 17 of larger size in the sectional girder 2.

While a specific embodiment of the invention has been shown and described in detail to illustrate the application of the inventive principles, it will be understood that the invention may be embodied otherwise without departing from such principles.

We claim:

1. In a surface formed by grate bars in pasteurizers, the grate bars being movable so as to perform a pilgrim step-type movement, and grate bars being placed on grate supports in the form of sectional girders, each sectional girder having an upper end face, wherein the grate bars have first and second ends placed on the sectional girders, the ends being Z-shaped, the improvement comprising each sectional girder having at the upper end face thereof a groove-shaped recess and each sectional girder having an elongated slot-like recess vertically spaced from the groove-shaped recess, each slot-like recess defining a lateral opening, the end of each grate having an opening for inserting the grate bar into the slot-like recess of the sectional girder, whereby, by inserting the first end of a grate bar in the slot-like recess of the sectional girder and raising the second end of an opposite grate bar, the first and second grate bar ends are vertically and laterally centered.

2. The grate bar surface according to claim 1, further comprising a comb-like girder for laterally centering the grate bar ends, the comb-like girder being arranged parallel to the sectional girders which extend transversely of the grate bar.

3. The grate bar surface according to claim 2, wherein the comb-like girder includes at least one web at the opening of the sectional girder for securing the grate bars against lateral displacement.

* * * * *